UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

No. 837,840.   Specification of Letters Patent.   Patented Dec 4, 1906.

Application filed September 20, 1905. Serial No. 279,356.

*To all whom it may concern:*

Be it known that I, MAX HENRY ISLER, chemist, a citizen of the Swiss Republic, residing at Mannheim, in the Grand Duchy of Baden, German Empire, have invented new and useful Improvements in Anthracene Dyes and Processes of Making the Same, of which the following is a specification.

I have discovered that by treating beta-methyl-anthraquinon or certain derivatives thereof with a condensing agent I can obtain a new yellow compound suitable for dyeing and printing, and especially dyeing and printing vegetable fiber.

The derivatives of beta-methyl-anthraquinon which can be employed for the purposes of my invention include those in which a hydrogen atom or hydrogen atoms of the methyl group is or are replaced by a halogen atom or atoms.

The condensing agents which I have found to be suitable for the purposes of my invention include the caustic alkalies, preferably in alcoholic solution and with or without the addition of an acetate. The new compound can be recrystallized from nitrobenzene, and thus be obtained in the form of golden-yellow crystals which are difficultly soluble in benzene, alcohol, ether, and acetone, but are soluble in concentrated sulfuric acid, the solution being bluish red. They are insoluble in caustic-alkali solution, but on treatment with alkaline reducing agents they are converted into the hydro compound, which is soluble in the alkaline solution with a brown-red color. The vat thus obtained dyes cotton brown-red shades, which upon washing, or more quickly upon treatment with dilute sodium hypochlorite solution, are converted into pure-yellow shades of excellent fastness against the action of washing, chlorin, light, and boiling with dilute acids.

For use in printing the new compound can be printed, together with caustic alkali and with or without a reducing agent onto the material, which is afterward steamed, or a mixture of the coloring-matter with a reducing agent can be applied to the material, which is afterward passed through an alkaline bath.

The following examples illustrate how my invention can be carried into practical effect; but it is not limited to these examples. The parts are by weight.

*Example 1.*

Heat together for from one (1) to two (2) hours at a temperature of from one hundred and fifty (150) to one hundred and seventy (170) degrees centigrade one (1) part of beta-methyl-anthraquinon, four (4) parts of potassium hydrate, and four (4) parts of alcohol. Pour the melt into water and boil for some time or else add some sodium hypochlorite to the solution in order to oxidize any hydro compound which may be present and then filter. If desired, an oxidizing agent—for instance, potassium nitrate or potassium chlorate—may be added to the melt at the start, in which case the temperature need not be raised above from one hundred and forty (140) to one hundred and fifty (150) degrees centigrade. The product obtained can be recrystallized from nitrobenzene and be thus obtained in the form of golden-yellow crystals, which are difficultly soluble in alcohol, ether, benzene, and acetone, but which dissolve in concentrated sulfuric acid, yielding a beautiful bluish-red solution. They are insoluble in caustic-alkali solution, but are soluble in alkaline solutions of reducing agents, being reduced to the hydro compound and yielding a brownish-red vat.

*Example 2.*

Heat together for about one (1) hour at a temperature of from one hundred and sixty (160) to one hundred and seventy (170) degrees centigrade one (1) part of omega-dichlor-beta-methyl-anthraquinon, $(C_6H_4-(CO)_2-C_6H_3.CHCl_2,)$ four (4) parts of potassium hydrate, and four (4) parts of alcohol. Pour the melt into water, boil for from thirty (30) to sixty (60) minutes, and filter off the reaction product. In this example the monochlor compound can be used instead of or in admixture with the omega-dichlor-beta-methyl-anthraquinon or the corresponding bromin derivatives can be employed. It is not necessary to work always with alcoholic potash, as the reaction also proceeds well if, for instance, one (1) part of omega-monochlor-beta-methyl-anthraquinon, four (4) parts of potassium hydrate, and one (1) part of anhydrous sodium acetate be heated together for about one (1) hour at a temperature of from one hundred and seventy (170) to one hundred and eighty (180) degrees centigrade.

Example 3.

Heat together two (2) parts of beta-methyl-anthraquinon and three (3) parts of lead oxid for a few hours at a temperature of from three hundred and twenty (320) to three hundred and forty (340) degrees centigrade until the melt, which at first is of a thin liquid consistency, becomes hard. The reaction product can be obtained in the pure form by extracting with alkaline hydrosulfite solution or with nitrobenzene or anilin or pyridin while heating. Instead of lead oxid other oxids—such, for instance, as copper oxid or barium oxid—can be employed.

Example 4.

Heat together for ten (10) hours in an autoclave at a temperature of from two hundred and ten (210) to two hundred and twenty (220) degrees centigrade one (1) part of omega-dichlor-beta-methyl-anthraquinon and twenty (20) parts of twenty (20) per cent. milk of lime. After cooling dissolve away the lime by means of hydrochloric acid and recrystallize the residue from nitrobenzene. In all cases the same product is finally obtained.

Example 5. Conversion of the New Coloring-Matter into its Hydro Compound for Use in Dyeing.

Stir well together one thousand (1,000) parts of water at a temperature of from fifty (50) to sixty (60) degrees centigrade, one-half (.5) part of the new coloring-matter which has previously been made into a paste with about twenty-five (25) parts of water, twenty-five (25) parts of caustic-soda solution (containing about twenty-four (24) per cent. of NaOH) and from ten (10) to fifteen (15) parts of a twenty (20) per cent. hydrosulfite solution. Work fifty (50) parts of cotton in this bath for from thirty (30) to forty-five (45) minutes, wash well, and work up. The bath does not become completely exhausted; but by the addition of from twenty-five (25) to fifty (50) parts of common salt or of Glauber salt the coloring-matter is used up to a greater degree.

Example 6. Use of the New Coloring-Matter for Printing.

*A. Process with subsequent use of caustic-alkali bath.*—Prepare a paste containing two hundred (200) parts of a ten (10) per cent. paste of the new coloring-matter, one hundred and twenty (120) parts of iron vitriol, twenty (20) parts of tin chlorid, two hundred (200) parts of tartaric acid, and four hundred and sixty (460) parts of thickening. The addition of the tartaric acid is not essential; but it assists in the subsequent removal of the iron. Print this paste onto the material dry and then pass the material for about fifteen (15) seconds through a fourteen (14) per cent. solution of caustic soda at a temperature of about seventy (70) degrees centigrade, wash, and then pass the material through sulfuric acid (containing about thirty-five (35) per cent. of $H_2SO_4$) for one (1) hour. Wash well, soap, treat lightly with chlorin.

*B. Process using steam.*—Prepare a paste containing two hundred (200) parts of a ten (10) per cent. paste of the new coloring-matter, eighty (80) parts of stannous oxid, (containing fifty (50) per cent. of the pure compound,) fifty (50) parts of glycerin, and six hundred and seventy (670) parts of thickening T. This thickening T is prepared from three hundred and twenty (320) parts of a sixty (60) per cent. dextrin thickening, three hundred and forty (340) parts of a fifty (50) per cent. gum thickening, and fourteen hundred and fifty (1,450) parts of a forty-one (41) per cent. caustic-soda solution. Print the paste onto the material and then dry at a temperature of from forty (40) to forty-five (45) degrees centigrade, steam for five (5) minutes in a Mather Platt apparatus, wash; treat lightly with chlorin, and then soap.

Now what I claim is—

1. The process for the production of coloring-matter of the anthracene series by heating a hereinbefore-defined beta-methyl-anthraquinon body with a condensing agent.

2. The process for the production of coloring-matter of the anthracene series by heating beta-methyl-anthraquinon with a condensing agent.

3. The process for the production of coloring-matter of the anthracene series by heating beta-methyl-anthraquinon with alcoholic caustic potash.

4. As a new article of manufacture the coloring-matter of the anthracene series which can be obtained by heating a hereinbefore-defined beta-methyl-anthraquinon body with a condensing agent, which coloring-matter crystallizes from nitrobenzene in golden-yellow crystals which are difficultly soluble in benzene, alcohol, and ether, which coloring-matter in the form of its leuco compound is soluble in caustic-alkali solution yielding a vat which dyes cotton red-brown shades, which shades upon washing become pure yellow.

In testimony whereof I have hereunto set my hand in the presence of two subscribing witnesses.

MAX HENRY ISLER.

Witnesses:
J. ALEX. LLOYD,
JOS. H. LEUTE.